Feb. 8, 1966     H. A. MAHONY     3,234,010
APPARATUS AND PROCESS FOR HIGH SPEED SCRAP SMELTING
Filed Dec. 31, 1962     2 Sheets-Sheet 1
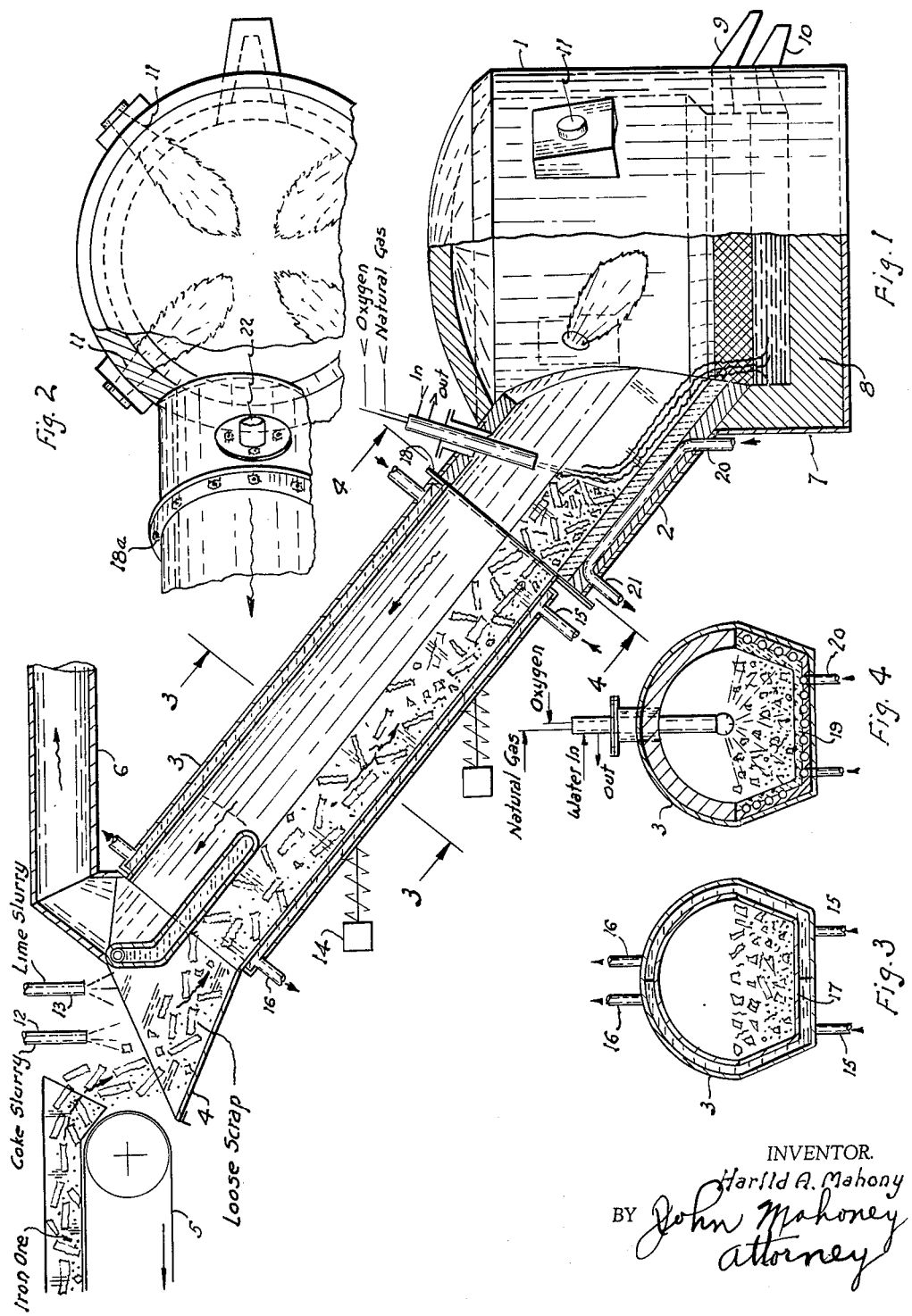
INVENTOR.
Harold A. Mahony
BY John Mahoney
attorney Feb. 8, 1966 H. A. MAHONY 3,234,010
APPARATUS AND PROCESS FOR HIGH SPEED SCRAP SMELTING
Filed Dec. 31, 1962 2 Sheets-Sheet 2
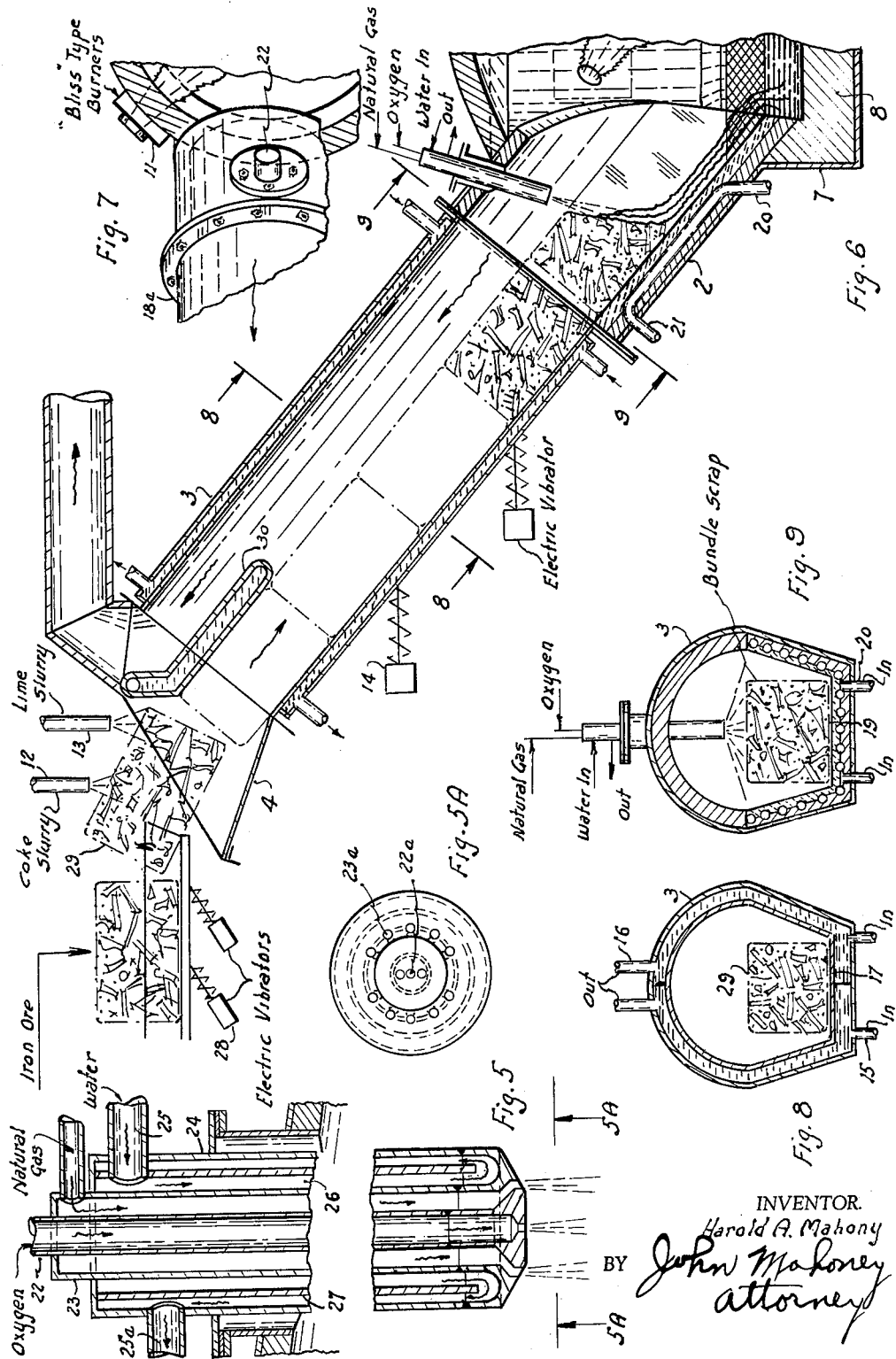
INVENTOR.
Harold A. Mahony
BY John Mahoney
attorney United States Patent Office 3,234,010
Patented Feb. 8, 1966

3,234,010
APPARATUS AND PROCESS FOR HIGH
SPEED SCRAP SMELTING
Harold A. Mahony, 1827 Taylor Road,
East Cleveland, Ohio
Filed Dec. 31, 1962, Ser. No. 248,729
17 Claims. (Cl. 75—43)

The present invention relates to an improved apparatus and process for smelting steel scrap material to remove impurities therefrom and to provide molten metal which preferably contains sufficient carbon to provide a mild steel which may be used as such in basic oxygen or continuous casting systems or which may be further refined in an open hearth or electrical furnace.

Because of impurities therein, steel scrap at the present time is comparatively low in price and it is an object of the present invention to provide an improved apparatus and a process for smelting the scrap and removing impurities therefrom to provide a steel which may contain carbon in an amount up to approximately 1%.

Another object of my invention is to provide an improved apparatus and a process of quickly smelting scrap and removing impurities therefrom to provide a hot metal charge which may be purified to provided ingots composed of a steel containing up to 1% of carbon.

My invention will be better understood by reference to the accompanying drawings in which:

FIG. 1 is a cross sectional view of my improved apparatus including a smelting furnace in which some parts are shown in section and other parts in elevation, and in which some parts are shown diagrammatically;

FIG. 2 is a plan view of the furnace with parts broken away and showing a throat connected to the furnace which is also shown partly broken away;

FIG. 3 is a cross sectional view taken on a plane passing through the line 3—3 of FIG. 1, looking in the direction of the arrows;

FIG. 4 is a cross sectional view taken on a plane passing through the line 4—4 of FIG. 1, looking in the direction of the arrows;

FIG. 5 is an enlarged cross sectional view of the water-cooled lance shown diagrammatically in FIG. 1 with a casing surrounding and in spaced relation to the wall of the lance for the introduction of natural gas;

FIG. 5A is a view taken on a plane passing through the line 5A—5A of FIG. 5, looking in the direction of the arrows;

FIG. 6 is a cross sectional view somewhat similar to that shown in FIG. 1 with parts of the furnace being broken away and showing bales of scrap being fed into the chute leading to the furnace;

FIG. 7 is a detail view showing part of the furnace in section and a plan view partly broken away of the throat leading into the furnace;

FIG. 8 is a cross sectional view taken on a plane passing through the line 8—8 of FIG. 6; and FIG. 9 is a cross sectional view taken on a plane passing through the line 9—9 of FIG. 6.

Briefly stated, my improved process relates to treating scrap, either in a loose state or in bales to provide a mild steel. In accordance with my invention, the scrap may be first dusted with a beneficiated iron ore containing fifty percent or more of iron and then with an aqueous slurry of coke and an aqueous slurry of a slag-forming material, such as lime or silica. The loose particles or bales are then passed down an inclined stack where they are subjected to the heat of a counter-current gas stream which is developed in the furnace and in an inclined throat which leads to the furnace.

My improved apparatus in which the scrap is reduced to a metallic state will now be specifically described.

As shown in FIGS. 1 to 5, the apparatus includes a furnace 1, an inclined throat 2, a stack 3, a chute having a mouth for receiving the scrap 4, a scrap conveyer 5, and a gas outlet conduit means 6 through which the spent gases pass and by means of which they may be recovered for subsequent use.

As shown, the hearth of the furnace 7 consists of a circular steel shell provided with a refractory lining 8 which may be acidic or basic depending upon the content of the scrap being smelted. The furnace is provided with a slag notch 9 for the removal of slag and a lower notch 10 for the removal of molten metal and a series of burners 11 are provided which extend through the walls of the furnace and are directed downwardly upon the slag in the furnace. The number of burners will of course depend upon the size of the furnace and are preferably spaced at equal distances from each other. Any suitable fuel may be utilized in the burners, such as pulverized coke, a hydrocarbon fuel oil, or natural gas, which fuel is mixed with approximately 10% to 12% by volume of oxygen. As shown four burners are provided and the temperature produced by these burners is approximately 3200° to 3500° F.

To provide a charge for the furnace, the scrap is first passed through a rotary shear to provide comparatively short pieces which are preferably no longer than approximately eight inches. After the scrap has been sheared to the desired length, it falls on to a conveyer arranged between spaced side walls upon which conveyer, the scrap travels a short distance horizontally, such as approximately ten feet or less, at which time it is preferably dusted with a finely ground beneficiated iron ore containing at least 50% of iron as shown diagrammatically in FIG. 1. The sheared metal then falls from the metal conveyer 5 into a chute 4 above which an aqueous slurry of coke and an aqueous slurry of a slag-forming material, such as lime or silica, are sprayed on to the scrap. The scrap then passes downwardly through the inclined stack and is assisted in its movement by electrical vibrators 14 arranged on the underside of the inclined stack which may be energized from any suitable source of electrical energy.

As the charged materials pass downwardly through the stack toward the furnace, they are heated by gases passing upwardly through the upper portion of the stack from the furnace and throat. As shown, the stack includes an outer casing spaced from the inner casing to provide a chamber for a cooling fluid, such as water, which passes into the chamber through conduit means 15 and from the casing through conduit means 16. The lower portion of the stack is provided with a wear resistant bottom portion 17.

As shown in FIG. 3, the bottom portion of the stack is preferably trapezoidal in shape to provide a comparatively large space and the upper portion is substantially circular and while the scrap passes downwardly in the stack, the hot gases passing upwardly in the upper portion of the stack, bake on the two slurry deposits and at the same time seal in a certain amount of beneficiated iron ore dust if such dust is present.

The scrap then passes into the throat 2, the upper portion of which has a flange 18 which is secured to a mating flange 18a extending outwardly from the stack and the lower portion of which extends into the furnace and is secured thereto by suitable means, such as welding. The throat 2 includes a refractory bottom portion 19 having a coil therein through which a cooling fluid, such as water, is introduced through a conduit means 20 and is discharged through a conduit means 21. To provide high heat to melt the scrap before it passes into the furnace, an oxygen lance 22 is provided which is inclined downwardly in a direction corresponding to the direction of the flow of the scrap metal and which extends through a sealed opening in the throat and through which oxygen is passed into the throat portion of the stack which is directed toward the loose scrap passing through the throat which is at this time in a substantially plastic state because of the high temperature of the gasses passing from the furnace and throat. The oxygen melts the scrap and because of the short distance between the oxygen lance and the furnace excessive oxidation of the molten metal is prevented. Additional means, however, are also provided to prevent oxidation of the molten metal and which also reduces any iron oxide that might be present, either in the scrap or in the beneficiated iron ore which has been dusted on to the scrap. For this purpose, a gas which is capable of forming hydrogen and carbon monoxide, such as natural gas, is passed through a separate chamber 23 surrounding the oxygen lance. The gas upon striking the hot plastic scrap at a temperature ranging from approximately 3200° to 3400° F. is decomposed or cracked to form carbon monoxide and hydrogen. In the event that iron ore is present in the form of magnetite, it is also quickly reduced at the high temperature, releasing oxygen which raises the temperature of the scrap to approximately 3600° F., thus further reducing the iron oxide which passes into the molten iron and steel stream. To prevent melting the oxygen lance and the casing 23 through which the natural gas passes, a casing 24 is arranged around the tube 23 to form a chamber through which a cooling fluid, such as water, may be passed, the cooling fluid being introduced through conduit means 25 into a chamber 26 formed by a baffle 27 and discharged through conduit means 25a extending through casing 24 which forms a chamber on the outer side of baffle 27. As shown in FIG. 5A, the oxygen is discharged from the lance in three parallel orifices 22a and these orifices are surrounded by the orifices 23a through which the natural gas is discharged into the throat. The oxygen lance 22 and casings 23 and 24 are preferably formed of a ferrous metal, such as steel, and terminate in a heat resistant copper alloy which is soldered to the lance and casings by a silver solder so that the inner portions of the lance and casings may be easily replaced.

The apparatus shown in FIGS. 6 to 9 is similar to that shown in FIGS. 1 to 5 and operates in substantially the same manner with the exception that the scrap is in the form of bales weighing approximately 100 pounds. The bales are rectangular in shape and are approximately 24 inches in thickness. As shown in FIG. 6 of the drawings, the bales are first passed longitudinally between the sides of a trough by mechanical means, not shown, and are assisted in their movement by electrical vibrators 28. During their passage through the trough, they may be sprayed with a finely divided beneficiated iron ore as shown diagrammatically in FIG. 6. The bales which are designated by the numeral 29 are then passed into the chute 4 where they are sprayed with an aqueous slurry of coke and an aqueous slurry of lime or silica depending upon the contents of the steel scrap and beneficiated iron ore. The bales are then passed into the chute 4 and downwardly through the stack and are assisted in their movement by the electrical vibrators 14. As the bales pass downwardly through the stack, they are subjected to the counter current passage of gases through the upper portion of the stack and as the bales pass through the throat 2, they become molten under the intense heat of oxygen passing through the water-cooled lance 22 which is inclined in a direction corresponding to the direction of the flow of the bales and is surrounded by casing 23 through which natural gas is passed as shown in FIG. 5. The oxides in the scrap are reduced by the carbon monoxide and hydrogen which are formed by the cracking or decomposing of the natural gas under the high heat. The hydrogen and carbon monoxide of course reduce any iron oxide that is present to metallic iron.

In both the stack shown in FIGS. 1 and 6, a water-cooled baffle 30 is provided which is pivoted at the mouth of chute 4 to prevent the entrance of excess air and is maintained in a set position by friction.

My improved process is designed to operate on a continuous basis and may be used for refining scrap or any desired type. For instance, scrap low in sulphur may be refined by the process in which case the furnace is provided with an acid refractory lining and instead of spraying the scrap with lime, it is sprayed with an aqueous slurry of silica. In view of the high temperature in the furnace, it will also be apparent that impurities, such as chromium oxide, having a comparatively high melting point will pass into the slag.

Another important feature of my invention is that the carbon content of the molten metal may be closely controlled because the heat generated in the melting section does not depend upon the coke charge for its heat and the coke is therefore not present in a quantity sufficient to saturate the iron or steel bath and in the event that a steel comparatively low in carbon is desired, the treatment of the charge with a slurry of coke may be omitted.

The lime slurry is of course provided to form the desired slag in the furnace. In the event that the scrap charge is of a comparatively high silica content, a silica instead of a lime slurry is sprayed on to the scrap.

The scrap is preferably dusted with the beneficiated iron ore to increase the yield of iron with a comparatively inexpensive charge. Because of the high heat in the furnace, the impurities in the beneficiated iron ore may be removed to provide a mild steel. The treatment of the scrap with the finely divided beneficiated iron ore, however, may be omitted.

What is claimed is:

1. The process of smelting metal scrap which comprises passing the scrap downwardly through an inclined stack through which hot reducing gases flow in a direction opposite to the flow of the scrap, applying oxygen to the scrap in a direction corresponding to the flow of the scrap metal and in an amount sufficient to melt the scrap as it passes through a throat leading into the furnace and simultaneously passing a sufficient amount of a gas containing hydrocarbons into the throat as the scrap passes through the throat to form a reducing gas, thereby reducing metal oxides in the scrap and providing the reducing gas which flows in a direction counter current to the downwardly passage of the scrap.

2. The process of smelting scrap which comprises spraying scrap with a slag-forming material and passing the scrap downwardly through a stack through which reducing gases flow in the opposite direction, simultaneously applying oxygen and a gas containing hydrocarbons to the scrap as the scrap passes through a throat leading into a furnace where the slag forms upon the molten metal, and directing a flame formed from a fuel containing oxygen downwardly against the slag in the furnace to maintain the slag and the metal in a molten state.

3. The process of continuously melting scrap which comprises spraying scrap with a slag-forming material and continuously passing the coated scrap downwardly through a stack through which a hot reducing gas is flowing in the opposite direction to preheat the metal scrap to approximately the plastic state, passing the scrap through a throat leading into a furnace and simultaneously applying oxygen and a gas containing hydrocarbons which crack under the high temperature in the throat to melt the scrap and reduce oxides that are present and to provide the gases which flow in the opposite direction to the descent of the iron scrap, applying a fuel including oxygen through burners extending through the furnace to provide a flame impinging upon the slag to maintain the slag and the metal in a molten state and continuously removing the slag and molten metal from the furnace.

4. The process of smelting metal scrap which comprises passing the scrap downwardly over the bottom portion of a downwardly inclined stack and into a throat and from the throat into a furnace, applying oxygen to the scrap in a direction corresponding to the flow of the scrap and in an amount sufficient to melt the scrap as the scrap passes through the throat and simultaneously passing a gas containing hydrocarbons in contact with the molten scrap as it passes through the throat, thereby providing a reducing gas, and passing said reducing gas in a direction counter current to the downward passage of the scrap to an outlet conduit means arranged at the upper portion of said stack.

5. The process of smelting scrap which comprises spraying the scrap with an aqueous slurry of coke and an aqueous slurry of a slag forming material, passing the treated scrap downwardly through an inclined stack through which hot reducing gases flow in the opposite direction, then passing the treated scrap through a throat leading into a furnace while simultaneously applying oxygen to melt the scrap and a hydrocarbon gas which cracks under the high temperature in the throat to provide reducing gases which reduce any iron oxide that is present and provides the reducing gas which flows upwardly in the stack in a direction counter to the descending scrap.

6. The process of smelting scrap which comprises treating the scrap with a powdered beneficiated iron ore containing at least 50% iron, spraying on to the dusted scrap an aqueous slurry of coke and an aqueous slurry of a slag-forming material, passing the treated scrap downwardly through an inclined stack through which hot reducing gases flow in the opposite direction to bake on the slurry deposits and to seal in at least part of the ore dusting, then passing the treated scrap through a throat leading into a furnace and simultaneously applying oxygen to the scrap and a natural gas which cracks at the high temperature in the throat to form reducing gases which reduce any iron oxide that is present and which provides the reducing gases which flow in the direction opposite to the downward travel of the scrap.

7. The process of smelting scrap which comprises forming scrap into bales, treating the bales with a beneficiated iron ore dust containing at least 50% iron, spraying on to the dusted scrap an aqueous slurry of coke and an aqueous slurry of a slag-forming material, passing the treated scrap downwardly through an inclined stack through which hot reducing gases flow in the opposite direction to bake on the two slurries and to seal in at least part of the ore dust, then passing the treated scrap through a throat leading into a furnace and simultaneously applying oxygen to the scrap to melt it and a natural gas which cracks at the high temperature in the throat to form reducing gases which reduce any iron oxide that is present and which flow in a direction opposite to the downward travel of the scrap.

8. Apparatus for smelting metal scrap including a furnace, a downwardly inclined stack for feeding metal scrap toward the furnace, a downwardly inclined throat having its upper portion connected to the lower portion of the stack and its lower portion connected to the furnace, a lance extending through said throat and being inclined downwardly in a direction corresponding to the direction of flow of the scrap metal for passing sufficient oxygen into the throat to melt the scrap passing therethrough, means arranged around the oxygen lance for passing a gas containing hydrocarbons into the throat to form reducing gases at the temperature provided by the oxygen, an outlet duct means arranged adjacent the upper end of the stack and communicating therewith, and said stack having a space above the downwardly descending metal scrap through which reducing gases from said throat pass to said duct means to preheat the scrap as it descends toward said throat.

9. Apparatus for smelting scrap metal including a furnace, a downwardly inclined stack for feeding metal scrap toward the furnace, means for spraying a material on to the scrap for forming a slag in the furnace, a downwardly inclined throat having its upper end portion connected to the stack and its lower end portion connected to the furnace, a lance extending through the throat and being inclined downwardly in a direction corresponding to the downwardly flow of the scrap metal for passing sufficient oxygen into the throat to melt the scrap as it passes through the throat, means for passing natural gas into the throat to provide reducing gases at the temperature provided by the oxygen therein, an outlet duct means arranged adjacent the upper end of and communicating with said stack, and said stack having a space above the downwardly descending metal scrap through which reducing gases from said throat pass to said duct means to preheat the scrap as it descends toward said throat.

10. Apparatus for smelting scrap including a furnace, a downwardly inclined stack for feeding scrap metal toward the furnace, a chute connected to the upper portion of said stack having a mouth for receiving the scrap, a downwardly inclined throat having its upper portion connected to the lower portion of the stack and its lower portion connected to the furnace, a lance extending through the throat and being inclined downwardly in a direction corresponding to the flow of the scrap material for passing sufficient oxygen into the throat to melt the scrap passing through the throat, means for passing natural gas into the throat to provide reducing gases at the temperature provided by the oxygen therein, said stack having a space above the downwardly descending metal scrap and an outlet duct means connected to the stack and communicating therewith through which reducing gases from the throat pass to preheat the scrap as it descends toward the throat, and a baffle pivotally mounted on the upper portion of the chute in proximity to its mouth for separating said outlet duct means from the chute and for minimizing the entrance of air into the stack from the atmosphere.

11. Apparatus for smelting scrap metal including a furnace, a downwardly inclined stack for feeding metal to the furnace, a downwardly inclined throat having its upper end connected to said stack and its lower portion connected to the furnace and being inclined downwardly at substantially the same inclination as the stack, outlet conduit means arranged adjacent the upper portion of said stack and communicating therewith, a lance extending through the throat and being inclined downwardly in a direction corresponding to the flow of the scrap metal for passing sufficient oxygen into the throat to melt the metal scrap passing through the throat, means for passing natural gas into said throat to provide reducing gases at the temperature provided by the oxygen in the throat for reducing oxides in said scrap and said stack having a space above the downwardly descending metal scrap which communicates with said outlet duct means for heating the scrap as it descends toward said throat, and a plurality of combined fuel and oxygen burners for directing flames upon the metal in the furnace.

12. Apparatus for smelting scrap metal including a downwardly inclined stack for receiving scrap metal, means for spraying a slag-forming slurry on to the scrap as it passes into the stack, a furnace having a circular wall, a downwardly inclined throat having its upper end connected to the stack and its lower end connected to the furnace, and outlet conduit means arranged adjacent the upper portion of said stack and communicating therewith, a lance extending through the throat for passing sufficient oxygen into the throat to melt the scrap as it passes through the throat, a casing surrounding the oxygen lance for passing natural gas into the throat to provide gases at the temperature provided therein by the oxygen for reducing iron oxide present in the scrap which reducing gases pass through the upper portion of said stack to said outlet conduit means to heat the scrap as it passes downwardly through the stack toward the throat, means for heating the metal in the furnace including a plurality of combined fuel and oxygen burners extending through the circular wall of the furnace and being inclined downwardly toward the metal in the furnace to maintain it in a molten state, and means for separately removing the slag and molten metal from the furnace.

13. Apparatus as defined in claim 12 including means for dusting a beneficiated iron ore in finely divided particles on to the scrap before it descends through the stack.

14. Apparatus as defined in claim 12 including means for spraying an aqueous slurry of coke on to the scrap to provide additional carbon for producing steel.

15. Apparatus for melting scrap including a downwardly inclined stack, a chute connected to the top portion of the stack and communicating therewith, an outlet duct means arranged at the upper portion of the stack in opposed relation to said chute and communicating with said stack, a furnace, a throat connected to the stack and to said furnace, a lance extending through the throat that is inclined downwardly in a direction corresponding to the flow of the metal for passing sufficient oxygen to melt the scrap as it passes through the throat, means simultaneously with the passage of the oxygen through said lance for passing a gas containing hydrocarbons in contact with the molten scrap as it passes through said throat to form reducing gases at the temperature provided by the oxygen to reduce oxides in said scrap and which flows above the scrap to said outlet duct means in a direction counter to the downwardly passage of the scrap to preheat the scrap as it flows downwardly through said stack to the throat.

16. Apparatus for smelting scrap including a furnace, a downwardly inclined stack of substantially the same cross sectional area throughout its length, the lower portion of which is substantially trapezoidal in shape and the upper portion of which is substantially semicircular in shape, a chute connected to the upper end portion of said stack and communicating with said stack, an outlet duct means connected to said chute and communicating with the circular passageway in said stack, a baffle pivotally connected to the chute in proximity to the junction of the chute and the outlet duct means and extending a substantial distance within the stack for forming an upper barrier for scrap passing into the trapezoidal portion of the stack, a downwardly inclined throat having its upper end connected to the lower portion of the stack and its lower portion connected to the furnace, an oxygen lance passing through the wall of the throat and being inclined downwardly in a direction corresponding to the flow of the scrap metal for melting the scrap passing through the throat, means associated with said lance for passing natural gas into the throat to form reducing gases at the temperature provided by the oxygen therein and the circular portion of said stack providing a passageway above the trapezoidal portion of the stack through which reducing gases from said throat pass to the outlet duct means connected to the chute to preheat the scrap as it descends toward said throat.

17. Apparatus for smelting scrap as specified in claim 16 in which said baffle is provided with a hollow interior portion containing water.

References Cited by the Examiner

UNITED STATES PATENTS

| | | | |
|---|---|---|---|
| 397,025 | 1/1889 | Rigaud | 266—25 |
| 820,134 | 5/1906 | Riveroll | 75—65 |
| 924,025 | 6/1909 | Wilshire | 266—25 |
| 1,476,106 | 12/1923 | Rochlitz | 75—43 |
| 1,739,278 | 12/1929 | Baily | 75—43 |
| 1,948,695 | 2/1934 | Brassert | 75—43 |
| 2,624,565 | 1/1953 | Kompart | 266—33 |
| 2,662,764 | 12/1953 | Arutunoff | 266—33 |
| 2,750,277 | 6/1956 | Marshall | 75—39 |
| 2,934,930 | 7/1960 | Proler | 75—44 |
| 3,008,819 | 11/1961 | Schmid | 75—43 |

OTHER REFERENCES

Kurzinski, E. F., "Oxy-Fuel Processes Increase Steelmaking Rates," Iron and Steel Engineer, February 1961, pages 67–73.

DAVID L. RECK, *Primary Examiner.*

WINSTON A. DOUGLAS, *Examiner.*